May 12, 1931.     E. KWARTZ     1,804,789
FOLDABLE RULE
Filed April 9, 1928
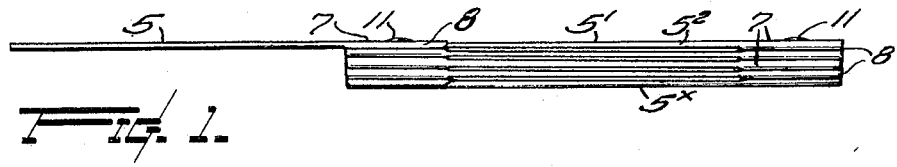
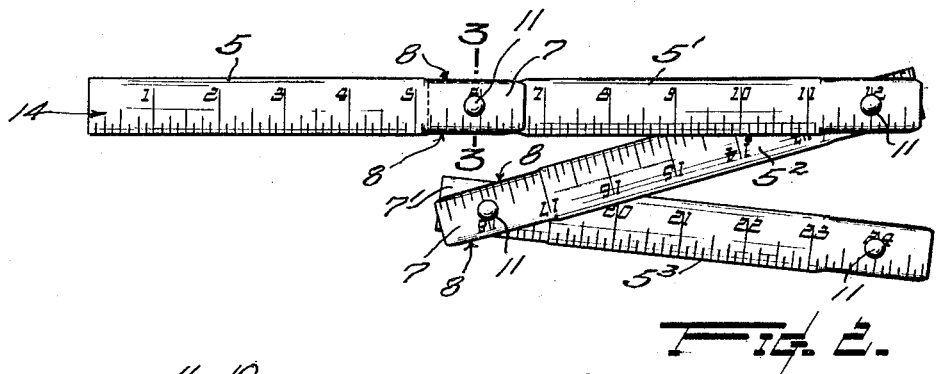
INVENTOR:
*Emil Kwartz*
BY
*Pierre Barnes*
ATTORNEY Patented May 12, 1931

1,804,789

UNITED STATES PATENT OFFICE

EMIL KWARTZ, OF SEATTLE, WASHINGTON

FOLDABLE RULE

Application filed April 9, 1928. Serial No. 268,624.

This invention relates to measuring rules designed, more especially, for engineers, mechanics, and the like, to take the place of rules heretofore in use.

The object of my invention is the provision of a foldable rule whereby lengths or distances within wide limits may be measured as accurately as by a single-piece rule.

With this object in view, and others, as will appear in the following specification, the invention consists in certain novel features of construction and arrangement of parts hereinafter described and claimed.

In the accompanying drawings,—

Figure 1 is a side elevation of a rule embodying one form of the invention, illustrated with one of its arms in its extended relation, and the other arms in their folded relation; Fig. 2 is a plan view of the rule shown in Fig. 1, but with the arms thereof shown arranged in somewhat different relations; Fig. 3 is a transverse sectional view on lines 3—3 of Figs. 2 and 4; and Fig. 4 is a fragmentary underside plan view of the rule at one of the arm-joints. Fig. 5 is a fragmentary plan view illustrating an arm joint assembly differing from that shown in the preceding views; Fig. 6 is a vertically longitudinal section of Fig. 5; and Fig. 7 is a transverse vertical section on line 7—7 of Fig. 5.

As shown in said drawing, a rule is composed of a plurality of rule sections 5, $5^1$, $5^x$, hereinafter termed "arms", which are of thin blades of steel or other suitably strong and elastic material.

Said arms are successively and foldably coupled together by means of pivot pins 6 extending through over-lying end portions 7, $7^1$ of the respective arms. Each of the arms has throughout its length transverse section a concavo-convex form.

An arm's end portion 7, hereinafter termed the saddle element, of the embodiment shown in Figs. 1 to 4, inclusive, is formed or provided with downwardly turned side flanges 8; and the portion $7^1$ at the other end of an arm is in the flanged saddle type of a reduced width to constitute a tongue element, as hereinafter termed, adapted to be lodged in the concavity between the side flanges 8 of a complementary saddle element of another arm when the respective arms are arranged in longitudinal alignment one with another.

In the construction shown in Figs. 5, 6 and 7, the saddle element 7 is unprovided with side flanges and in lieu thereof the saddle element is provided with apertures 15 an 16, one at each side of the associated pivot pin 6 either of which apertures serves as a socket for a stud 17 provided upon the tongue $7^1$ according to whether the arms are in their relatively extended or folded positions.

The complementary arms are yieldably held in their longitudinally aligned positions by interfitting of the elements 7 and $7^1$. The elasticity of the arms allowing the flattening of the same for turning about the axes of the respective pins 6.

In Figs. 3 and 4, I show supplementary elastic securing devices comprising a spring metal washer plate 9, preferably rectangular, having a central hole 10 (Fig. 3) to receive the respective pivot pin 6.

When a plate 9 is utilized it is connected to the rule at each of the joints thereof by means of the respective pin, a head 11 thereof bearing against the convex surface of a saddle element 7 and a head 12 against a plate 9 so as to cause the latter to have its side edges 13 contact with the concave surface of the respective tongue element as shown in Figs. 3 and 4.

The rule is provided with a scale 14 which may have any suitable graduations thereon; for instance, that shown in Fig. 2 being designed to represent inches and aliquot parts thereof.

The headed pivots 6 and the spring washer plates 9 serve to yieldingly retain the several rule arms in close relation at their respective tongue and groove engagement, as represented in Fig. 3, when the arms are in alignment with respect to each other, either in their relatively extended positions as represented by the arms 5 and $5^1$ in Figs. 1, 2, 4, 5 and 6, or when in their relatively folded positions as represented by the arms $5^1$—$5^x$ in Fig. 1.

The interengagement of the side edges of the tongue elements 7¹ with the flanges 8 of the groove elements 7 serve to normally retain the rule straight when extended more or less as may be required.

To change the rule from its folded to its extended condition, the free end of the uppermost arm 5 is swung horizontally for 180° circular movement about its pivotal connection with the arm 5¹ thus bringing the arm 5 into the position in which it is shown in Figs. 1 and 2, and causing the associated ends as 7 and 7¹ to interengage each other, the spring washer 9 yielding and the arms flattening to permit lateral displacement of the arms one over the other in the unfolding of the rule. A similar temporary distortion occurs to the arm parts in proximity of the respective joints in the refolding of the rule.

From the foregoing it is apparent that the rule when folded into a small compass is adapted to be conveniently carried in a person's pocket, yet is capable of being readily extended to a desired length, within the limit of the rule, so that distances may be measured with the accuracy of a single stick rule.

When extended my improved manner of articulating the successive arm members affords a relatively rigid and straight rule.

The transverse curvature of the arm members afford of themselves joints which mate one with another and, with some rules, suffice to retain the members in alignment with each other without the use of ancillary securing devices such as the side flanges 8, shown in Figs. 3 and 4, or the studs 17 and the recesses therefor, as shown in Figs. 5 and 6.

The concavo-convex transverse configuration of the rule, moreover, provides a most economical distribution of material with regard to strength and weight.

The invention and the manner of using the invention will be understood from the foregoing description.

What I claim, is,—

1. In a foldable rule of the character described, two arm members of concavo-convex transverse forms arranged one above the other with the concavities thereof underneath, a pin pivotally connecting said arm members together near one end of each, the upper of said members having flanges depending from opposite sides thereof in proximity to said pin, the lower member having its end portion of a reduced width to provide a tongue element the side edges thereof being engageable with the respective flanges of the upper member for aligning the two arm-members with respect to each other in either their extended or folded positions, and a spring acting supplementary to the tendency of the normal transverse sections of the members for yieldably retaining the tongue element of one member in engaged relation with the flange elements of the other member in both the extended and folded positions thereof.

2. A foldable rule comprising a plurality of straight members pivotally connected together adjacent to their respective ends, said members being of concavo-convex form in transverse section and arranged to swing about the axes of their pivotal connections with each other, the surfaces of each member in proximity of its pivotal connections with other members being adapted to fit against the surfaces of the members next above and below respectively, a spring washer plate mounted upon each of the rule pivots for yieldably retaining together the interengageable concave and convex surfaces of adjacent members in both their folded and extended relations.

3. A foldable rule comprising a plurality of straight members pivotally connected together adjacent to their respective ends, said members being of concavo-convex form in transverse section and arranged to swing about the axes of their pivotal connections with each other, the surfaces of each member in proximity of its pivotal connections with other members being adapted to engage the surfaces of the members next above and below respectively.

4. A foldable rule composed of a plurality of members of concavo-convex form in transverse section, said members being pivotally connected successively with each other by means of pins, said pins being arranged to have the ends of the successive members overlap each other when the respective members are in their extended relations, said overlapping ends fitting one within the other, and means cooperating with the rule members for yieldably retaining them in alignment.

Signed at Seattle, Washington, this 2nd day of April, 1928.

EMIL KWARTZ.